(12) United States Patent
Koyama

(10) Patent No.: US 8,687,298 B2
(45) Date of Patent: Apr. 1, 2014

(54) LENS BARREL AND IMAGING DEVICE

(75) Inventor: Terunori Koyama, Sagamihara (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 13/415,210

(22) Filed: Mar. 8, 2012

(65) Prior Publication Data

US 2012/0229923 A1    Sep. 13, 2012

(30) Foreign Application Priority Data

Mar. 10, 2011   (JP) .................................. 2011-53643

(51) Int. Cl.
*G02B 7/02* (2006.01)

(52) U.S. Cl.
USPC ............................ 359/826; 359/823; 396/349

(58) Field of Classification Search
USPC ................. 359/819, 822, 823, 826, 827, 828; 396/349, 531
See application file for complete search history.

(56) References Cited

U.S. PATENT DOCUMENTS

| | | | |
|---|---|---|---|
| 7,477,454 B2 | 1/2009 | Shinohara et al. | |
| 7,551,376 B2 | 6/2009 | Koyama | |
| 7,701,646 B2 | 4/2010 | Koyama | |
| 8,075,206 B2 | 12/2011 | Koyama | |
| 2006/0115262 A1* | 6/2006 | Nomura | 396/349 |
| 2007/0153403 A1* | 7/2007 | Yamazaki | 359/819 |
| 2008/0180812 A1* | 7/2008 | Honsho et al. | 359/700 |
| 2010/0247092 A1* | 9/2010 | Koyama | 396/529 |
| 2011/0019078 A1* | 1/2011 | Iwasaki et al. | 348/374 |
| 2011/0194852 A1 | 8/2011 | Koyama | |

FOREIGN PATENT DOCUMENTS

| | | |
|---|---|---|
| JP | 9-211292 | 8/1997 |
| JP | 2003-322786 | 11/2003 |
| JP | 2006-243606 | 9/2006 |
| JP | 2006-250996 | 9/2006 |
| JP | 2006-259344 | 9/2006 |
| JP | 2007-316386 | 12/2007 |
| JP | 2008-90201 | 4/2008 |
| JP | 2008-191428 | 8/2008 |
| JP | 2008-233575 | 10/2008 |
| JP | 2008-256899 | 10/2008 |
| JP | 2009-69290 | 4/2009 |
| JP | 2009-169388 | 7/2009 |
| JP | 2009-198876 | 9/2009 |
| JP | 2010-145757 | 7/2010 |
| JP | 2012-18387 | 1/2012 |
| WO | WO 2011/155618 A1 | 12/2011 |

\* cited by examiner

*Primary Examiner* — Ricky Mack
*Assistant Examiner* — Gary O'Neill
(74) *Attorney, Agent, or Firm* — Oblon, Spivak, McClelland, Maier & Neustadt, L.L.P.

(57) ABSTRACT

A lens barrel includes a fixed cylinder, a first rotary cylinder rotatably provided around an axis relative to the fixed cylinder, and a moving cylinder disposed inside of the first rotary cylinder to move integrally with the first rotary cylinder on the axis and rotate around the axis relative to the first rotary cylinder. The moving cylinder includes a front protrusion group of three or more protrusions and a rear protrusion group of two or more protrusions on an outer circumference. The first rotary cylinder includes, in an inner circumference, a first circumferential groove, a second circumferential groove, a first guide having three or more depressions, and a second guide having two or more depressions. The first rotary cylinder and the moving cylinder are coupled with each other by fitting the front and rear protrusion groups into the first and second circumferential grooves, respectively.

16 Claims, 15 Drawing Sheets

LENS BARREL AND IMAGING DEVICE

CROSS REFERENCE TO RELATED APPLICATION

The present application is based on and claims priority from Japanese Patent Application No. 2011-53643, filed on Mar. 10, 2011, the disclosure of which is hereby incorporated by reference in its entirety.

BACKGROUND OF THE INVENTION

1. Field of the Invention

The present invention relates to a lens barrel of an optical system to image a subject, particularly to one with an improved impact tolerability, and an imaging device incorporating such a lens barrel.

2. Description of the Prior Art

A lens barrel of an imaging device as a digital camera or a silver-salt camera is contained in a camera body and that of a lens interchangeable camera as a single reflex camera is separable from a camera body. Both of the lens barrels may receive a large impact when a user accidentally drops the camera or hits another object.

There are various lens mount systems and one of them is a bayonet type. The bayonet mount type is to join relatively moving cylindrical elements by fitting the protrusions into their corresponding depressions and circumferential grooves. In the bayonet mount lens barrel, when receiving a large impact to a protrusion on a mechanically weak portion, the cylindrical element may be deformed, disconnecting the protrusions from the depressions and grooves, and making it impossible to perform the following shooting operation.

Specifically, the cylindrical elements are combined by fitting the protrusions on one male element into the depressions on the other female element and relatively moving the elements axially and relatively rotating them around the axis to insert the protrusion into the circumferential grooves. When provided with a clearance groove for the pin or a cam groove in a circumferentially large area, the strength of the male cylindrical element with the protrusions is insufficiently low, especially in a portion in which the clearance groove and the cam groove overlap with each other. Accordingly, the protrusion areas are susceptible to an impact and easily deformable. The protrusion are thus easily disconnected from the depressions.

In order to prevent the protrusions from disconnecting, the width of the protrusions can be increased. However, a small increase in the width exert little effect and a large increase exerts mechanical strengths but it is necessary to precisely process the front and back sides of the protrusion in terms of parallelism. Alternatively, the depth of the connection can be increased or the cylindrical element can be made of an aluminum alloy rod by cutwork instead of synthetic resin or else. This can make the cylindrical element less deformable against an impact.

However, there is a problem in increasing the depth of the bayonet connection that the lens barrel is enlarged in diameter since the radial thickness of the connecting elements needs to be greatly increased. Also, it takes a long time to manufacture the cylindrical element made of the aluminum alloy rod, which is nonproductive. Further, the weight thereof is heavier than that of a general element made from synthetic resin so that the top end portion of the lens barrel may be inclined downward when extended.

Japanese Patent Application Publication No. 2003-322786 (Reference 1), for example, discloses a bayonet mount lens barrel to increase strength against external force by increasing the rotary angle of the bayonet connection and prevent moving lens groups from collapsing by their own weight. It includes a first cylinder with protrusions and a second cylinder with slits matching the protrusions, to bayonet-connect the first and second cylinders by fitting the protrusions into the slits. The combinations of the protrusions and slits are differently shaped.

Reference 1 has a problem that the protrusions and slits in different shapes and different radial sizes cause an increase in the size of the lens barrel, specially, in radial direction.

Further, Japanese Patent Application Publication No. H09-211292 (Reference 2) discloses another example of a bayonet mount type lens barrel in which lens holders can be easily and accurately assembled. However, it does not address an improvement in impact tolerability.

Japanese Patent Application Publication No. 2009-169388 (Reference 3) discloses another example of a bayonet mount type lens barrel which includes a fixed cylinder, a first rotary cylinder rotatable around the axis relative to the fixed cylinder, a moving disposed inside the first rotary cylinder integrally moving with the first rotary cylinder along the axis and relatively rotating thereto around the axis, and a second rotary cylinder disposed inside the moving cylinder and having a through hole. The moving cylinder includes three or more protrusions on the outer circumference and the first rotary cylinder includes three or more matching slits and circumferential grooves so that the moving cylinder and the first rotary cylinder are coupled with each other by inserting the protrusions into the slits and grooves. Further, the second rotary cylinder includes pins, the moving cylinder includes a matching through hole, and at least two of the three or more protrusions are arranged so as not to overlap with the through hole on the axis. Thereby, upon receiving an impact, the connection of the protrusions and slits can be maintained irrespective of an extended position of the lens barrel.

However, the lens barrel in Reference 3 cannot exert sufficient tolerability to a large impact from a lens barrel's dropping or hitting another object.

SUMMARY OF THE INVENTION

The present invention aims to provide a bayonet mount type lens barrel which includes, at the back closer to an image plane, an increased number of protrusions in wider angle width and matching depressions and circumferential grooves, to effectively prevent the locking of the protrusions and depressions and circumferential grooves from being disengaged irrespective of an extended position of the lens barrel when receiving a large impact, as well as an imaging device, a data terminal device and an image input device incorporating such a lens barrel.

According to one aspect of the present invention, a lens barrel includes a fixed cylinder, a first rotary cylinder rotatably provided around an axis relative to the fixed cylinder, and a moving cylinder disposed inside of the first rotary cylinder to move integrally with the first rotary cylinder on the axis and rotate around the axis relative to the first rotary cylinder, wherein the moving cylinder includes a front protrusion group of three or more protrusions on an outer circumference on a subject side, and a rear protrusion group of two or more protrusions in a larger circumferential width than the front protrusion group on an outer circumference closer to an image plane side than the front protrusion group; the first rotary cylinder includes, in an inner circumference, a first circumferential groove formed at a position in association with an axial position of the front protrusion group of the moving cylinder, a second circumferential groove formed at a position in association with an axial position of the rear protrusion group of the moving cylinder, a first guide having three or more depressions into which the protrusions of the front protrusion group are inserted, respectively, extending in parallel to the axis to communicate with the first circumferential groove, and a second guide having two or more depressions into which the protrusions of the rear protrusion group are inserted, extending in parallel to the axis to communicate with the second circumferential groove; and the first rotary cylinder and the moving cylinder are coupled with each other by fitting the front and rear protrusion groups into the first and second circumferential grooves, respectively.

BRIEF DESCRIPTION OF THE DRAWINGS

Features, embodiments, and advantages of the present invention will become apparent from the following detailed description with reference to the accompanying drawings.

DETAILED DESCRIPTION OF THE PREFERRED EMBODIMENTS

Hereinafter, lens barrels according to embodiments of the present invention will be described in detail with reference to the accompanying drawings. Wherever possible, the same reference numbers will be used throughout the drawings to refer to the same or like parts.

First Embodiment

Figure 1:
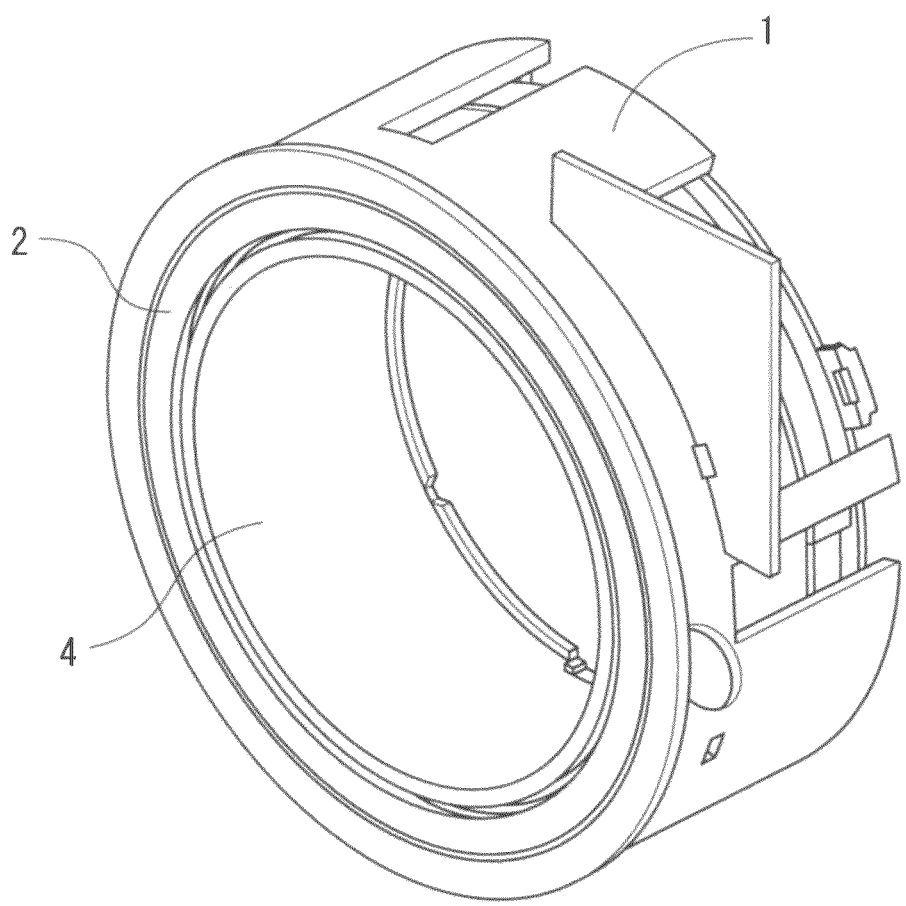
FIG. 1 is a perspective view of a lens barrel according to a first embodiment of the present invention when barrels are contained.
Figure 2:
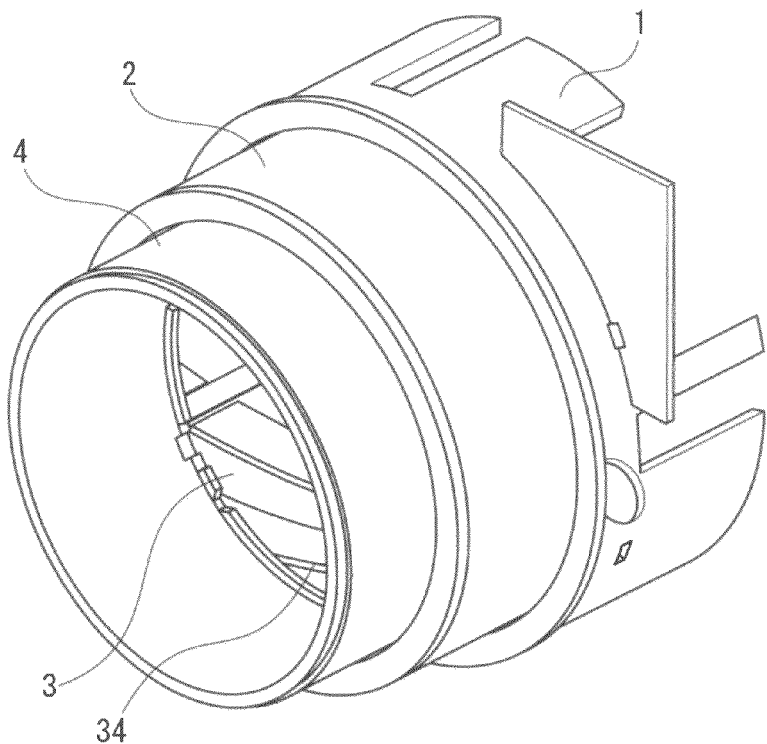
FIG. 2 is a perspective view of the lens barrel in FIG. 1 when the barrels are at a shooting startup position.
Figure 3:
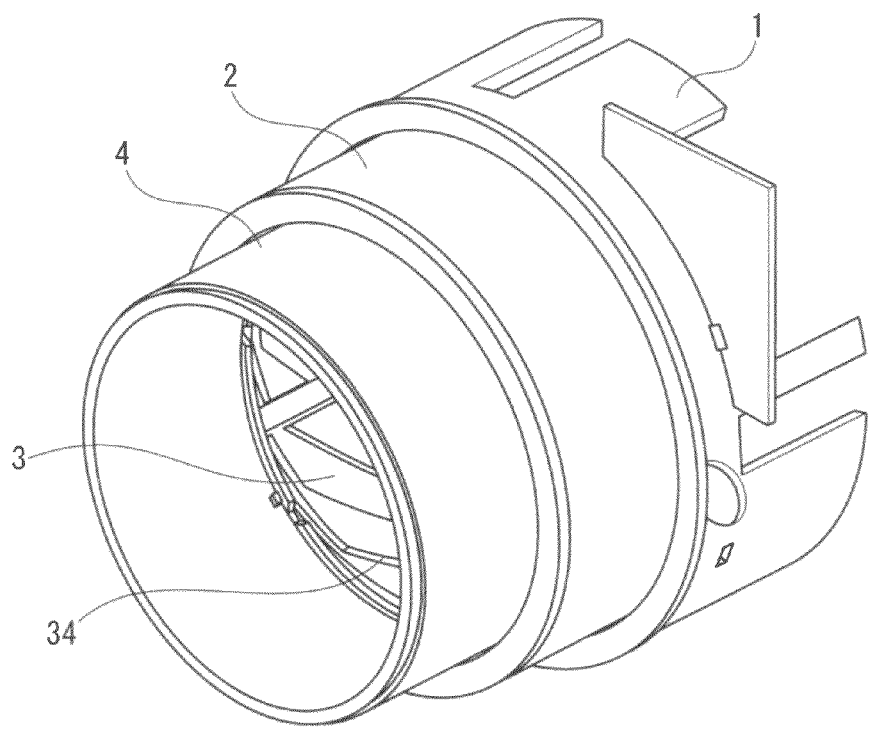
FIG. 3 is a perspective view of the lens barrel in FIG. 1 when the barrels are most extended for shooting.
Figure 4:
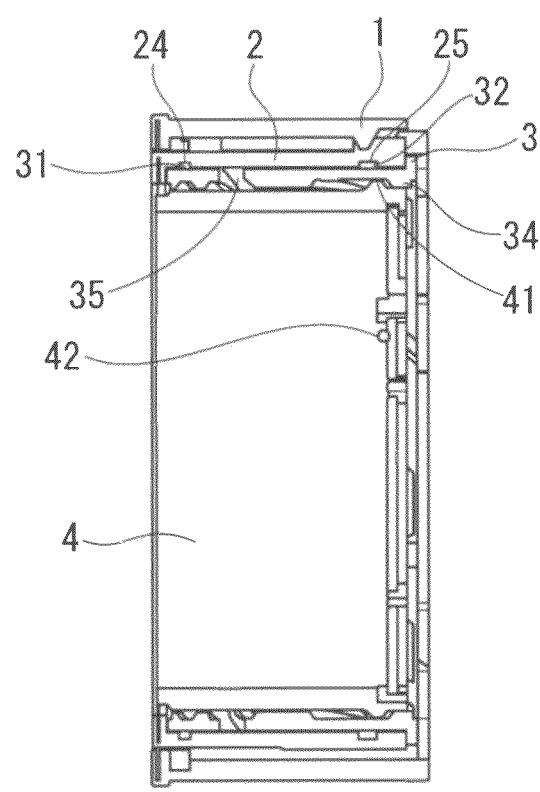
FIG. 4 is a longitudinal cross section view of the lens barrel in FIG. 1 when the barrels are contained.
Figure 5:
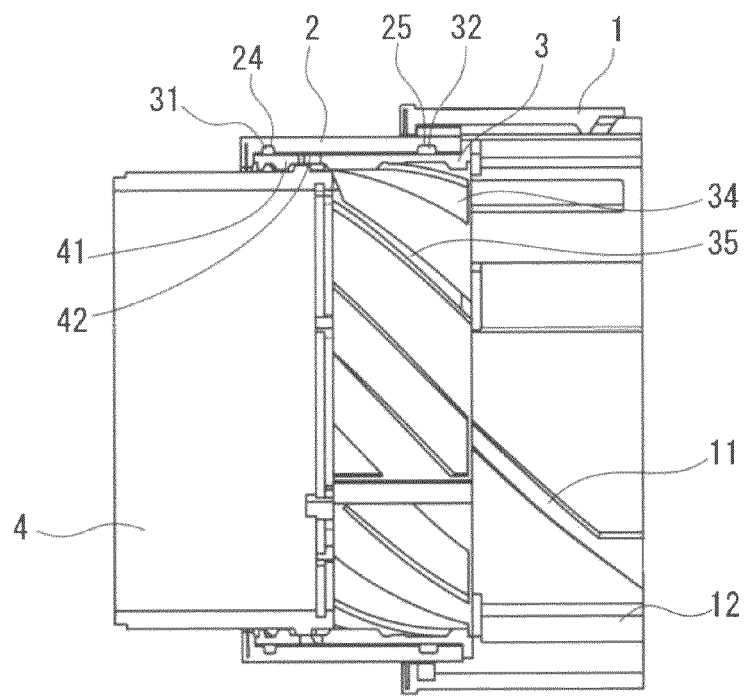
FIG. 5 a longitudinal cross section view of the lens barrel in FIG. 4 when the barrels are at the startup position for shooting.
Figure 6:
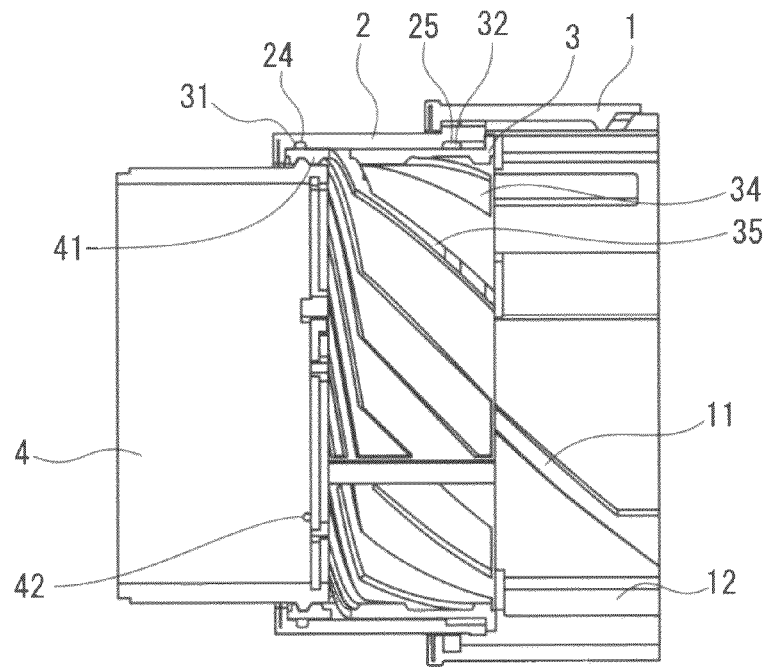
FIG. 6 a longitudinal cross section view of the lens barrel in FIG. 4 when the barrels are most extended for shooting.
Figure 7:
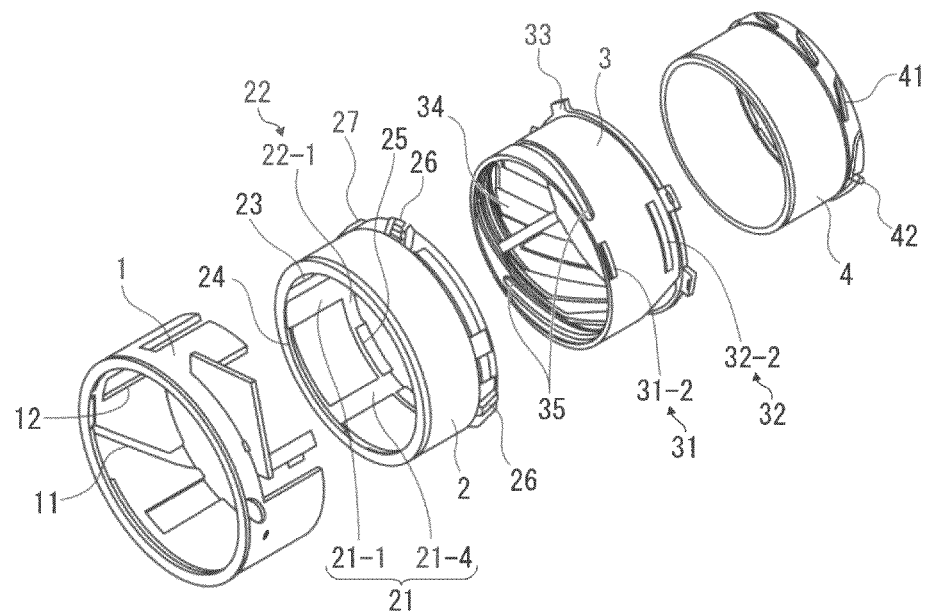
FIG. 7 is an exploded perspective view of the lens barrel in FIG. 4.
Figure 8:
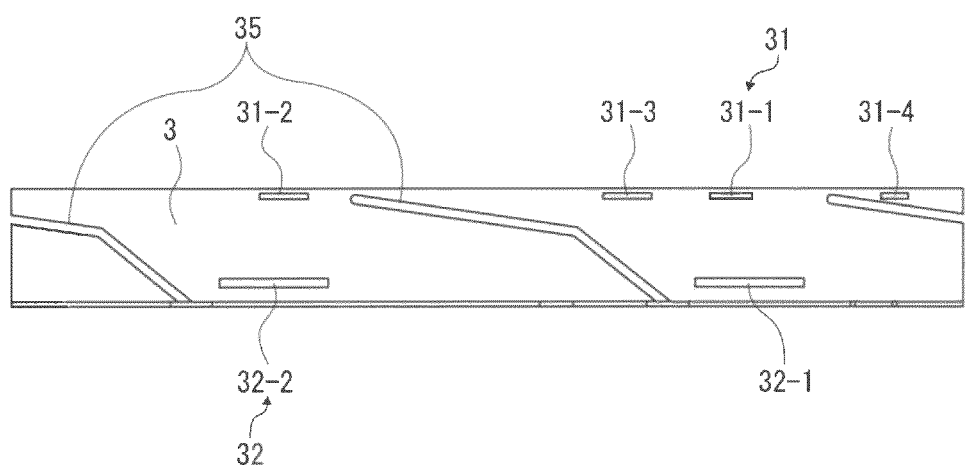
FIG. 8 is a developed view of the outer circumference of a moving cylinder of the lens barrel in FIG. 4.
Figure 9:
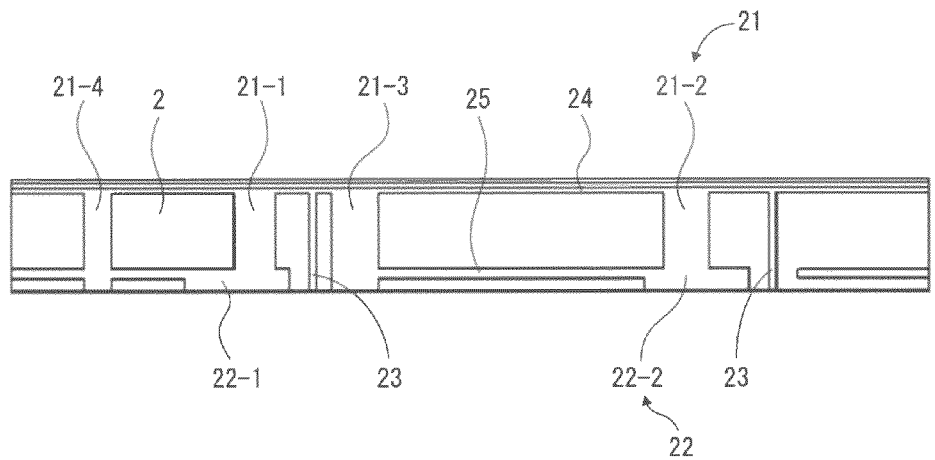
FIG. 9 is a developed view of the inner circumference of a first rotary cylinder of the lens barrel in FIG. 4.

FIG. 1 to FIG. 3 show the common structure of lens barrels according to first to third embodiments. FIG. 1 is a perspective view of a lens barrel when barrels are contained, FIG. 2 is a perspective view of the lens barrel in FIG. 1 when the barrels are at a shooting startup position, and FIG. 3 is a perspective view of the lens barrel in FIG. 1 when the barrels are most extended for shooting. FIG. 4 to FIG. 9 show the features of the lens barrel according to the first embodiment. FIG. 4 is a longitudinal section view of the lens barrel in FIG. 1 when the barrels are contained. FIG. 5 is a longitudinal cross section view of the lens barrel in FIG. 2 when the barrels are at the shooting startup position. FIG. 6 is a longitudinal cross section view of the lens barrel in FIG. 3 when the barrels are most extended for shooting. FIG. 7 is an exploded perspective view of the lens barrel in FIG. 4. FIG. 8 is a developed view of the outer circumference of a moving cylinder of the lens barrel in FIG. 4. FIG. 9 is a developed view of the inner circumference of a first rotary cylinder of the lens barrel in FIG. 4.

FIG. 10 to FIG. 14 show the positional relation of the moving cylinder and the first rotary cylinder in circumferential direction. In the drawings the front end portions of both cylinders on a subject side are shown inside and the rear end portions thereof on an image plane side are shown outside and the rear end portions are depicted larger in diameter than the front end portions for simplicity. Needless to say that they are the same in diameter in reality. FIG. 10-14 show coupled position, contained position, position between the contained position and startup position, and extended position, respectively.

Referring to FIG. 1 to FIG. 9, the lens barrel includes a fixed cylinder 1, a first rotary cylinder 2, a moving cylinder 3 and a second rotary cylinder 4. The fixed cylinder 1 includes a helicoid 11 and a straight groove 12 in an inner circumference. The first cylinder 2 includes, in an inner circumference, depressions 21-1 to 21-4 constituting a first guide 21, depressions 22-1, 22-2 constituting a second guide 22, two straight grooves 23, a first circumferential groove 24 and a second circumferential groove 25, and includes helicoids 26 and a rack 27 on the outer circumference at the rear end. The moving cylinder 3 includes a front protrusion group 31 of protrusions 31-1 to 31-4 on the outer circumference at the front end (subject side), a rear protrusion group of protrusions 32-1, 32-2 and a protrusion 33 at the rear end (image plane side), a helicoid 34 in an inner circumference, and a through groove 35 as a clearance groove through the inner to outer circumferences. The second rotary cylinder 4 includes helicoids 41 and two pins 42 on the outer circumference at the rear end.

The fixed cylinder 1 is fixed to a not-shown base and the first rotary cylinder 2 is inserted into the inside of the fixed cylinder 1 from the rear end (image plane side or right end in FIG. 4 to FIG. 6), and the moving cylinder 3 is inserted into the inside of the first rotary cylinder 2. The fixed cylinder 1 and the moving cylinder 3 are bayonet connected. The female helicoid 11 has a large pitch and the straight grooves 12 extend in parallel to the axis at appropriate positions in the inner circumference of the fixed cylinder 1. The male helicoids 26 in a very short height on the outer circumference of the first rotary cylinder 2 are fitted into the female helicoid 11 as shown in FIG. 7. The rack 27 surrounds the helicoids 26 and engages with a not-shown pinion rotated by a not-shown motor.

The rotation of the pinion rotates the first rotary cylinder 2 around the optical axis via the rack 27 and moves it forward and backward along the optical axis inside the fixed cylinder 1 with the male helicoids 26 guided by the female helicoid 11. The pinion has a long axial length to cover the moving area of the first rotary cylinder 2 so that the rack 27 is not disengaged from the moving first rotary cylinder 2. The protrusion 33 of the moving cylinder 3 is fitted into the straight groove 12 and the moving cylinder 3 axially moves straight along the straight groove 12 without rotating.

The depressions as a guide are arranged in the inner circumference of the first rotary cylinder 2 along the optical axis. With reference to FIGS. 7, 9, 10 to 14, the first to fourth depressions 21-1 to 21-4 as the first guide 21 are provided to communicate with the first circumferential groove 24 at their front ends in the present embodiment. The first circumferential groove 24 is provided near the front end of the first rotary cylinder 2.

Further, the first and second depressions 22-1, 22-2 as the second guide 22 extend from the rear end along the optical axis on the first rotary cylinder 2 behind the first guide 21. The first and second depressions 22-1, 22-2 are much wider circumferentially than the first to fourth depressions 21-1 to 21-4 and communicate therewith. Also, they communicate at the front ends with the second circumferential groove 25 formed near the back end of the first rotary cylinder 2.

Thus, the width of the first and second depressions 21-1, 21-2 of the first guide 21 is set to be within the width of the first and second depressions 22-1, 22-2 as the second guide 22 in circumferential direction. The first and second depressions 22-1, 22-2 extend forward in the inner circumference of the first rotary cylinder 2 and the second circumferential groove 25 is placed at the front end of the depressions 22-1, 22-2. The first and second depressions 21-1, 21-2 extend forward from the front edge of the first and second depressions 22-1, 22-2 and the first circumferential groove 24 is placed at the front end of the first and second depressions 21-1, 21-2. The third and fourth depressions 21-3, 21-4 of the first guide 21 extend forward from the back end of the first rotary cylinder 2 and the first circumferential groove 24 is formed at the front end of the third and fourth depressions.

Further, the two straight grooves 23 are disposed along the optical axis in the inner circumference of the first rotary cylinder 2 not to overlap with all the depressions. Referring to FIGS. 7-8, 10 to 14, the front protrusion group 31 of the moving cylinder 3 have a circumferential width matching with that of the first and fourth depressions 21-1 to 21-4 and an axial width matching with that of the first circumferential groove 24 so that they are inserted into and guided by the depressions 21-1 to 21-4 and the first circumferential groove 24.

Likewise, the rear protrusion group 32 of the moving cylinder 3 have a circumferential width matching with that of the first and second depressions 22-1 to 22-2 of the second guide 22 and an axial width matching with that of the first circumferential groove 25 so that they are inserted into and guided by the depressions 22-1, 22-2 and the first circumferential groove 25.

In FIG. 10 to FIG. 14 the first to fourth protrusions 31-1 to 31-4 of the front protrusion group 31 and the first and second protrusions 32-1, 32-2 of the rear protrusion group 32 have the same height or protrude on the moving cylinder 3 with the same amount. These protrusions are fitted into the depressions and into the circumferential grooves by relatively turning the first rotary cylinder 2 and the moving cylinder 3 around the optical axis.

Thus, by locking of the protrusions and the grooves, the moving cylinder 3 is integrally movable along the optical axis with the first rotary cylinder 2 and relatively rotatable around the optical axis. The first rotary cylinder 2 and the moving cylinder 3 are bayonet-connected. Further, the pins 42 stand on a part of the male helicoid 41 of the second rotary cylinder 4 in FIG. 7, the male helicoid 41 is fitted into the female helicoid 34 of the moving cylinder 3, and the pins 42 are inserted through the through groove 35 and fitted into the straight grooves 23 (FIG. 9) of the first rotary cylinder 2 as shown in FIGS. 5, 6. The straight grooves 23 function to transmit the rotation of the first rotary cylinder 2 to the second rotary cylinder 4 via the pins 42 and allow the second rotary cylinder 4 to move along the optical axis relative to the first rotary cylinder 2.

Specifically, the rotation of the first rotary cylinder 2 around the optical axis is transmitted to the pins 42 through the straight grooves 23, rotating the second rotary cylinder 4 relative to the moving cylinder 3 together with the first rotary cylinder 2. By the locking of the helicoid 41 and the helicoid 34 of the moving cylinder 3, the second rotary cylinder 4 moves forward and backward along the optical axis, which moves the pins 42 in rotation in accordance with the pitch of the helicoids 34, 41. The through groove 35 is formed with the same pitch as that of the helicoids 34, 41 in a slightly larger width than the diameter of the pins 42, in order to prevent the pins 42 from interfering with the moving cylinder 3.

The second rotary cylinder 4 includes an arbitrary number of not-shown cam grooves in the inner circumference. A lens holder is contained inside the second rotary cylinder 4 and a second moving cylinder is contained in the lens holder. The lens holder holds a first lens group for example in position and moves along the optical axis together with the first lens group by the rotation of the second rotary cylinder 4. A lens frame holding a second lens group in position for example is contained inside the second moving cylinder. The second lens group is guided by the cam grooves along the optical axis along with the movement of the second moving cylinder.

The lens barrel according to the present embodiment is applicable to a retractable type zoom lens, for example. In the following the extending operation of such a retractable zoom lens is described when the elements are extended to a shooting ready position, a closest shooting position as wide-angle end, and a furthest shooting position as telephoto end from the contained position. The first rotary cylinder 2 is rotated by the motor and moves along the optical axis with the helicoid 26 guided by the helicoid 11 of the fixed cylinder 1. Inside the first rotary cylinder 2 the moving cylinder 3 moves along the optical axis together with the first rotary cylinder 2 without rotating owing to the locking of the protrusion 33 and the straight groove 12 of the fixed cylinder 1, the front protrusion group 31 and the first circumferential groove 24 of the first rotary cylinder 2, and the rear protrusion group 32 and the second circumferential groove 25. By the locking of the pins 42 and the straight grooves 23, the rotation of the first rotary cylinder 2 is transmitted to the second rotary cylinder, and the second rotary cylinder moves forward and backward in rotation along the optical axis by the engagement of the helicoid 41 and the helicoid 34 of the moving cylinder 3.

FIGS. 1 and 4 show the lens barrel in which the first rotary cylinder 2, moving cylinder 3 and second rotary cylinder 4 are retreated inside the fixed cylinder 1. FIGS. 2 and 5 show the same in which the first rotary cylinder 2 and moving cylinder 3 are extended from the fixed cylinder 1 and the moving cylinder 3 is extended from the second rotary cylinder 4 to reach a closest shooting position or startup position. FIGS. 3 and 6 show the same in which the moving cylinder 3 is extended from the second rotary cylinder 4 from the closest shooting position to a furthest shooting position or most extended position.

Now, the mount structure of the rotary cylinder and the moving cylinder is described in detail. The first rotary cylinder 2 and the moving cylinder 3 are coupled by inserting the four front protrusions 31-1 to 31-4 into the four depressions 21-1 to 21-4 and the two rear protrusions 32-1, 32-2 into the two depressions 22-1, 22-2, respectively, and turning the first rotary cylinder 2 relative to the moving cylinder 3 clockwise in FIGS. 10 to 14 once the protrusions reach the bottoms of the depressions to fit the protrusions 31-1 to 31-4 into the first circumferential groove 24 and the protrusions 32-1, 32-2 into the second circumferential groove 25.

Figure 10:
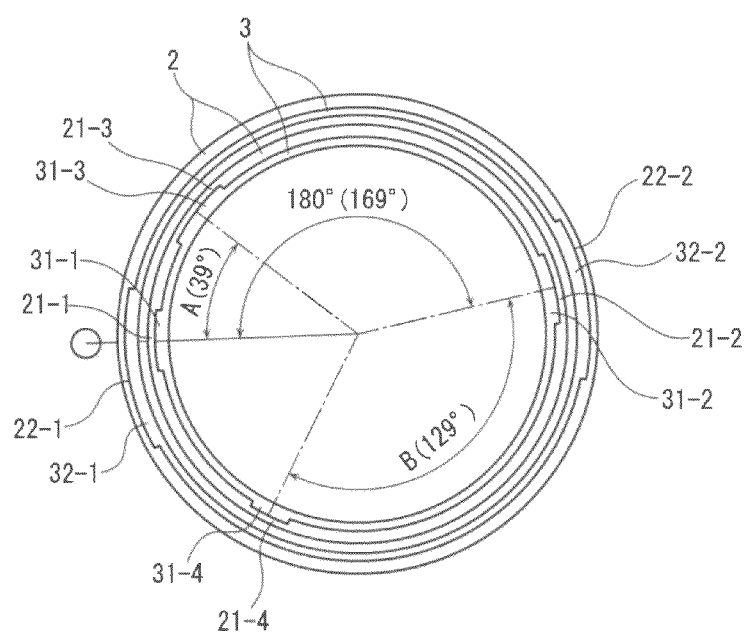
FIG. 10 is a traverse cross section view of the lens barrel in FIG. 4 in which the moving cylinder and the first rotary cylinder are coupled with each other and a front end close to a subject is depicted inside and an a rear end close to an image plane is depicted outside.

In FIG. 10 the moving cylinder 3 and first rotary cylinder 2 are coupled with the first to fourth protrusions 31-1 to 31-4 inserted into the depression 21-1 to 21-4 and the first and second protrusions 32-1, 32-2 inserted into the depressions 22-1, 22-2, respectively. The first and second protrusions 31-1, 31-2 of the front protrusion group 31 of the moving cylinder 3 are spaced about 180 degrees apart circumferentially and oppose each other across the optical axis or the axis of the moving cylinder 3. The third protrusion 31-3 is placed at a rotary angle A of 90 degrees or less relative to the axis of the moving cylinder 3, for example at 39 degrees clockwise, away from the first protrusion 31-1. The fourth protrusion 31-4 is placed at 90 degrees or less and the angle A or more away from the first protrusion 31-1 counterclockwise. The angle B between the second protrusion 31-2 and the fourth protrusion 31-4 is for example about 129 degrees which is larger than the angle A.

The circumferential width of the first protrusion 31-1 is set to be smaller than that of the second protrusion 31-2 and the third protrusion 31-3 and larger than that of the fourth protrusion 31-4. The pair of the first and second protrusions 31-1, 31-2 in a circumferential width of about 30 degree spaced about 180 degrees apart are unsusceptible to an impact from a lens barrel's falling. However, it is difficult to maintain the first rotary cylinder 2 and the moving cylinder 3 in parallel position with only the two protrusions. Two protrusions in a small width can be additionally formed at 90 degrees away from the first and second protrusions 31-1, 31-2. However, upon every relative rotation of the first rotary cylinder 2 and the moving cylinder 3, the small-width protrusions are fitted into the large-width depressions of the first guide 21, which is unstable and likely to come off.

In view of the above, in the present embodiment the pair of main protrusions 31-1, 31-2 are circumferentially spaced about 180 degrees, for example 169 degrees apart so that their strength against an impact is sufficient. In addition, the third and fourth protrusions 31-3, 31-4 are provided in the above-described manner.

In addition, the moving cylinder 3 includes the first and second protrusions 32-1, 32-2 as the rear protrusion group 32. The first and second protrusions 32-1, 32-2 are spaced about 180 degrees apart circumferentially and oppose each other across the optical axis behind the front protrusion group 31. The circumferential width of the first and second protrusions 32-1, 32-2 is set to be larger than that of the front protrusion group 31, for example, at twice or more angular width, about 40 degrees. In the present embodiment each of the front protrusion group 32 is placed within the angular width of the rear protrusion group 32. Because of this, the moving cylinder 3 and first rotary cylinder 2 can be bayonet-connected stably and unsusceptible to an impact from a lens barrel's dropping or hitting another object. Further, the front protrusion group is arranged so that when one of the third and fourth protrusions 31-3, 31-4 is moved along with the rotation of the moving cylinder 3 and the first rotary cylinder 2 and aligned with the first and second depressions 21-1, 21-2, the other of them is not aligned with either of them. Accordingly, the bayonet connection can be always stable.

The shape and size of the longitudinal cross sections of the depressions of the first guide 21 are formed to match those of the protrusions of the front protrusion group 31 seen from the optical axis. Likewise, the shape and size of the longitudinal cross sections of the depressions of the second guide 22 are formed to match those of the protrusions of the rear protrusion group 32 seen from the optical axis.

Figure 11:
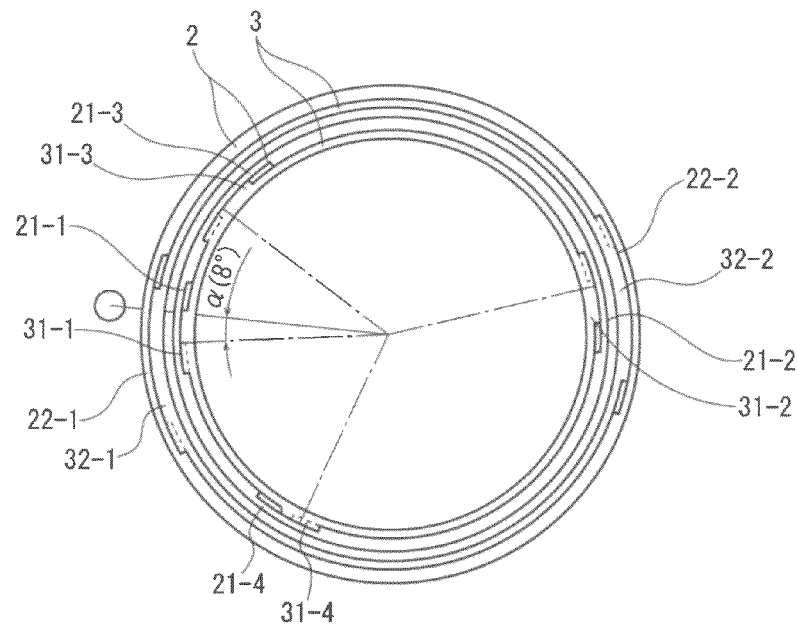
FIG. 11 is a traverse cross section view of the lens barrel in FIG. 4 in which the moving cylinder and the first rotary cylinder are contained.

After the protrusions of the front and rear protrusion groups 31, 32 reach the bottoms of the depressions of the first and second guides 21, 22, the first rotary cylinder 2 is rotated at a small angle of about 8 degrees clockwise to bayonet-connect with the moving cylinder 3 with the front and rear protrusion groups fitted into the first and second circumferential grooves 24, 25 in FIG. 11. The elements of the lens barrel are contained in the fixed cylinder 1.

Figure 12:
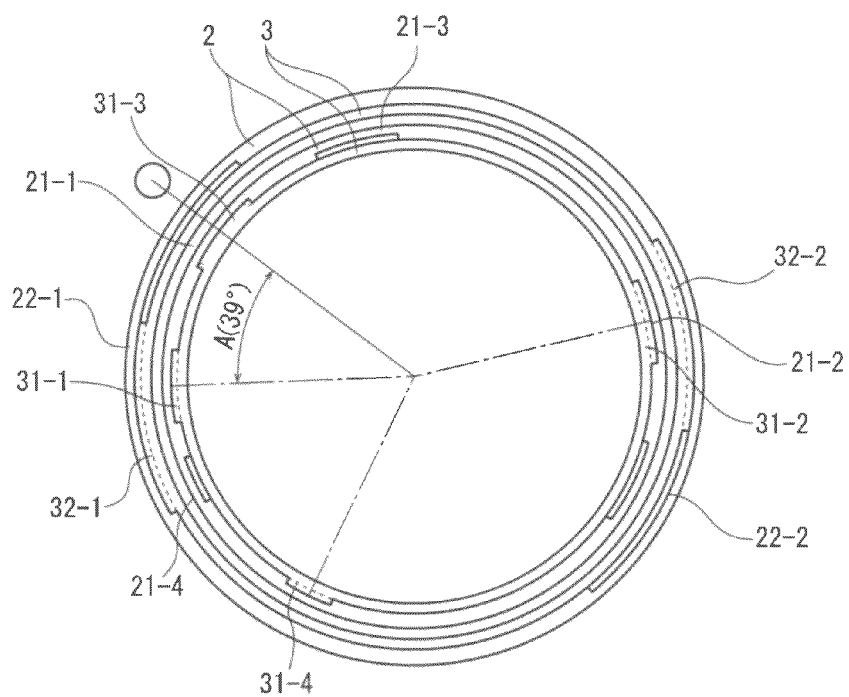
FIG. 12 is a traverse cross section view of the lens barrel in FIG. 4 in which the moving cylinder and the first rotary cylinder are between the contained position and the startup position.

In FIG. 12 the elements of the lens barrel are being extended from the contained position to the shooting position. The rotary angle of the first rotary cylinder 2 is the angle A of about 39 degrees relative to the coupled position in FIG. 1 and the third protrusion 31-3 of the front protrusion group 31 faces the first depression 21-1 of the first guide 21.

With the third protrusion 31-3 in a larger width than the first depression 21-1 and the above-described angular relation of the front and rear protrusion groups 31, 32, the front protrusion group 31 except for the third protrusion 31-3 do not oppose any depression of the first rotary cylinder 2. Accordingly, the first rotary cylinder and moving cylinder 3 can be stably bayonet connected. The locking of the protrusion groups and the depressions of the first and second guides is not disengaged.

Figure 13:
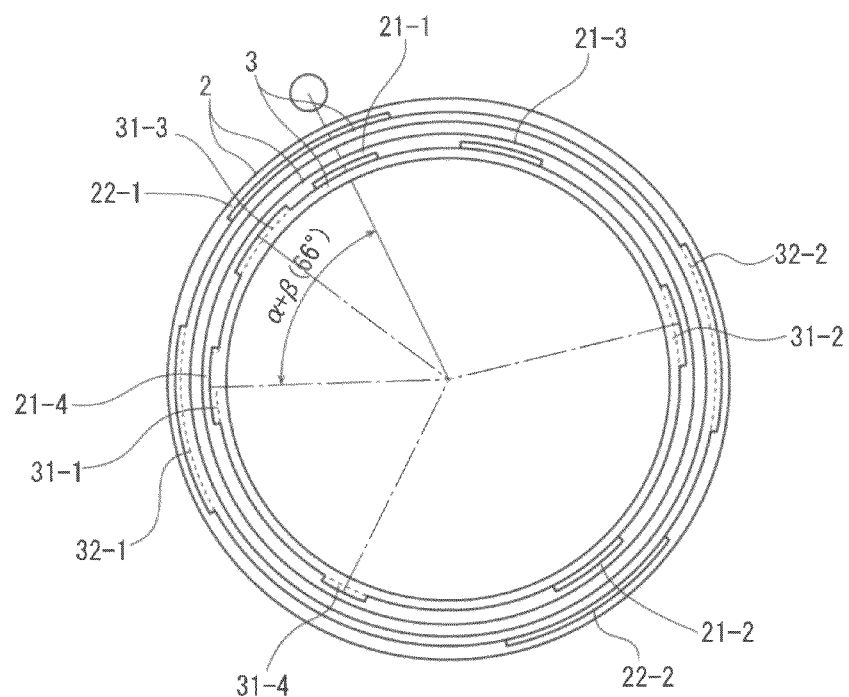
FIG. 13 is a traverse cross section view of the lens barrel in FIG. 4 in which the moving cylinder and the first rotary cylinder are at the startup position.

In FIG. 13 the first rotary cylinder 2 is extended to the closest shooting position or startup position. The rotary angle of the first rotary cylinder 2 relative to that in the coupled position in FIG. 10 is expressed by $\alpha+\beta$ where $\alpha$ is a relative rotary angle of the first rotary cylinder 2 and the moving cylinder 3 from the coupled position and the contained position, and $\beta$ is a relative rotary angle of the first rotary cylinder and the moving cylinder from the contained position to the closest shooting position. The closest shooting position is for example at a wide-angle end. The relation between the rotary angle $\alpha+\beta$ and the angle A is $(\alpha+\beta)>A$.

Figure 14:
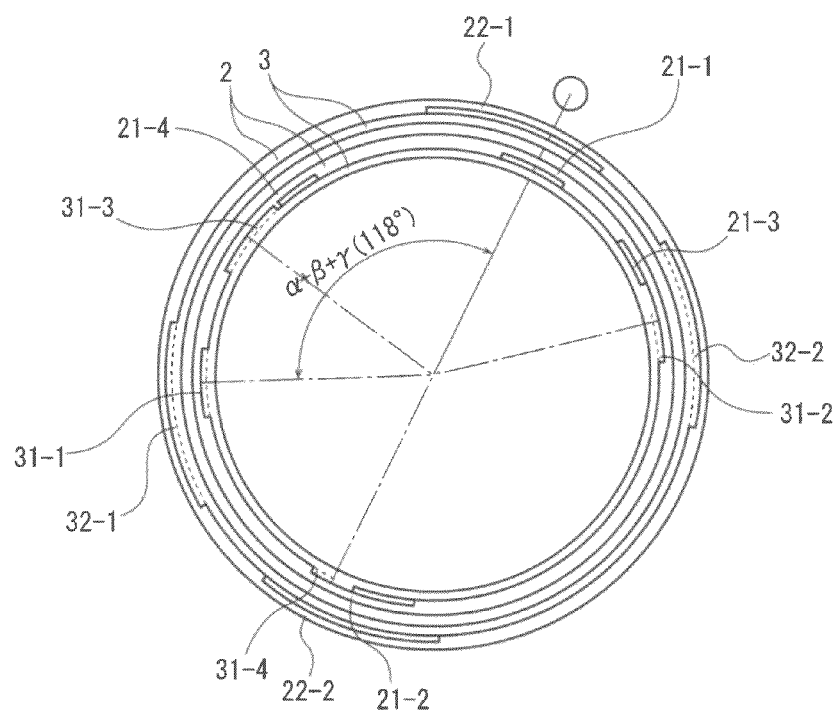
FIG. 14 is a traverse cross section view of the lens barrel in FIG. 4 in which the moving cylinder and the first rotary cylinder are at the extended position.

Along with the clockwise rotation of the first rotary cylinder 2, the lens groups constituting a zoom lens are moved along the optical axis and a focal length is continuously changed. In FIG. 14 the first rotary cylinder 2 and the moving cylinder 3 are extended to a furthest shooting position or most extended position. The rotary angle of the first rotary cylinder 2 therein relative to that of the coupled position in FIG. 10 is expressed by $\alpha+\beta+\gamma$ where $\gamma$ is a relative rotary angle of the first rotary cylinder and the moving cylinder from the closest shooting position to the furthest shooting position. The relation of the rotary angle of the first rotary cylinder 2 and the angle B is $\alpha+\beta+\gamma<B$.

From the contained position in FIG. 10 to the furthest shooting position in FIG. 14, one of the front protrusion group 31 can oppose one of the depressions 21-1 to 21-4 of the first guide 21, but the other ones do not face any of the depressions 21-1 to 21-4 and either of the rear protrusion group 32 does not face any of the depressions 22-1, 22-2 of the second guide 22. This can maintain the bayonet connection stably.

The first and second protrusions 31-1, 31-2 of the front protrusion group 31 and the first and second protrusions 32-1, 32-2 as the rear protrusion groups 32 are paired respectively, and carefully positioned relative to the through grooves 35 in the moving cylinder 3. Referring to FIG. 8, the two through grooves 35 are spaced 180 degrees apart circumferentially in the moving cylinder 3. The angular width thereof is smaller than 180 degrees, for example, about 150 degrees. The pairs of the first protrusions 31-1, 32-1 and the second protrusions 31-2, 32-2 are disposed on two angular areas on the circumference, respectively which do not overlap with either of the through grooves 35. The third and fourth protrusions 31-3, 31-4 of the front protrusion group 31 are disposed in areas which overlap with the through grooves 35 along the axis.

Due to the two through grooves 35, the mechanical strength of the moving cylinder 3 is decreased but that of the surrounding areas of the pairs of the first and second protrusions 31-1, 31-2, 32-1, 32-2 is not. Even upon receiving an impact from a dropping lens barrel, the surrounding areas of the protrusion pairs are unlikely to be deformed so that the bayonet connection can be maintained stably without an increase in the protruded amount of the protrusions, which can prevent the lens barrel from increasing in diameter. The first rotary cylinder 2 and moving cylinder 3 can be relatively moved safely.

Thus, in the present embodiment the four protrusions of the front protrusion group 31 are provided near the subject side end of the moving cylinder 3 in association with the most extended position and the two protrusions of the rear protrusion group 32 are provided near the image plane side end in association with the contained position. Thus, the bayonet connection can be prevented from disconnected irrespective of the position of the lens barrel unlike that in the prior art.

In the present embodiment the number of the protrusions of the front protrusion group 31 of the moving cylinder 3 is 4. The number of protrusions of the rear protrusion group 32 is two. Alternatively, the number of protrusions of the front group can be 3, the main protrusions 31-1, 31-2 plus another auxiliary one. The numbers of the front and rear protrusion groups 31, 32 can be three or more and two or more, respectively. The height of the protrusions of the front and rear protrusion groups 31, 32 can be different, however, preferably, they have the same height as in FIGS. 10 to 14 so that the corresponding depressions of the first and second guides 21, 22 can have an even depth. This can reduce the thickness of the first rotary cylinder 2 and reduce the size of the lens barrel in radial direction.

Second Embodiment

Figure 15:
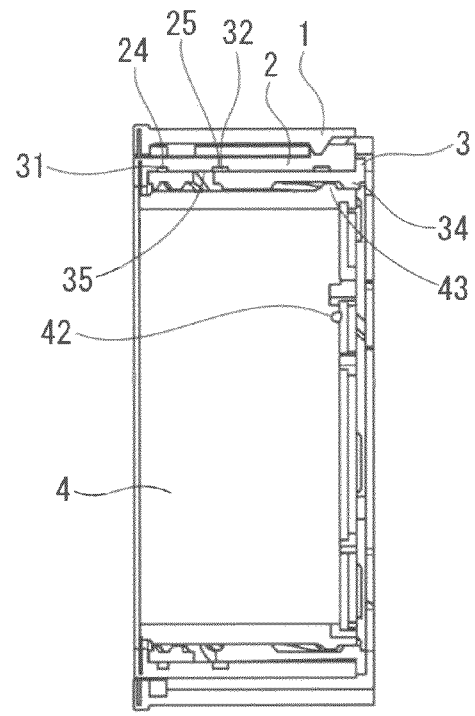
FIG. 15 is a longitudinal cross section view of a lens barrel according to a second embodiment of the present invention when the barrels are contained.
Figure 16:
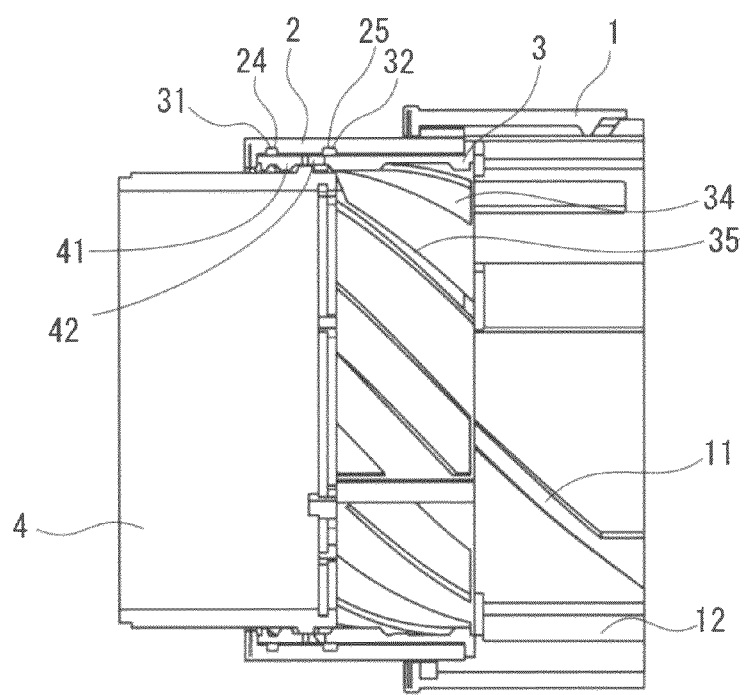
FIG. 16 is a longitudinal cross section view of the lens barrel in FIG. 15 when the barrels are at the shooting startup position.
Figure 17:
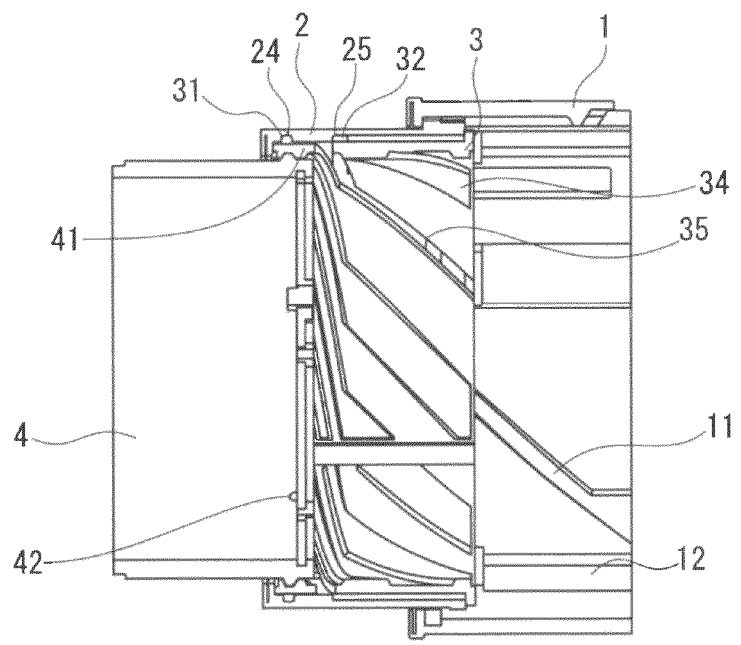
FIG. 17 is a longitudinal cross section view of the lens barrel in FIG. 15 when the barrels are extended for shooting.
Figure 18:
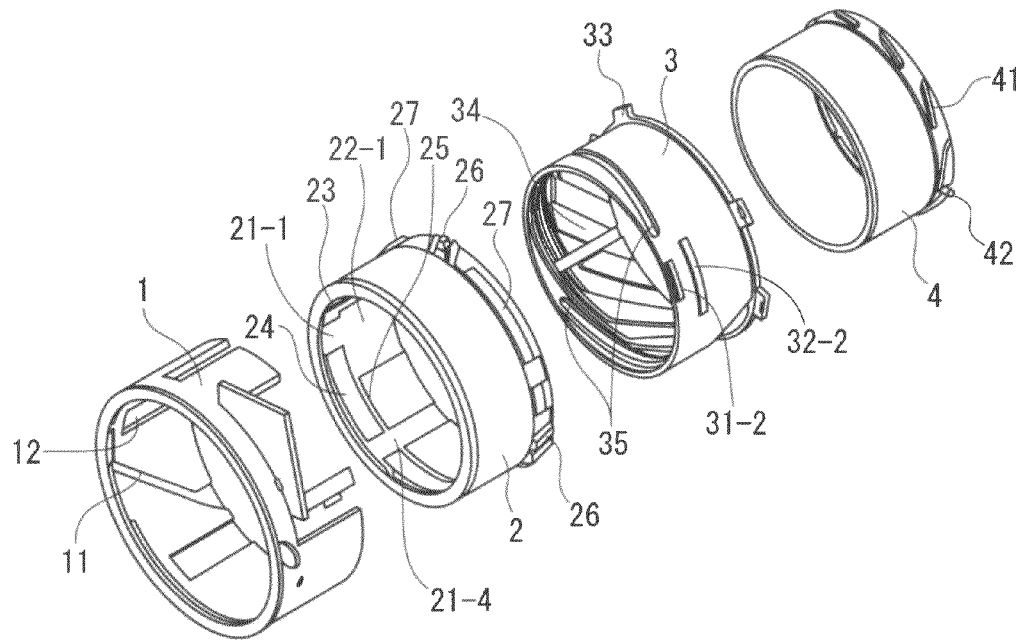
FIG. 18 is an exploded perspective view of the lens barrel in FIG. 15.
Figure 19:
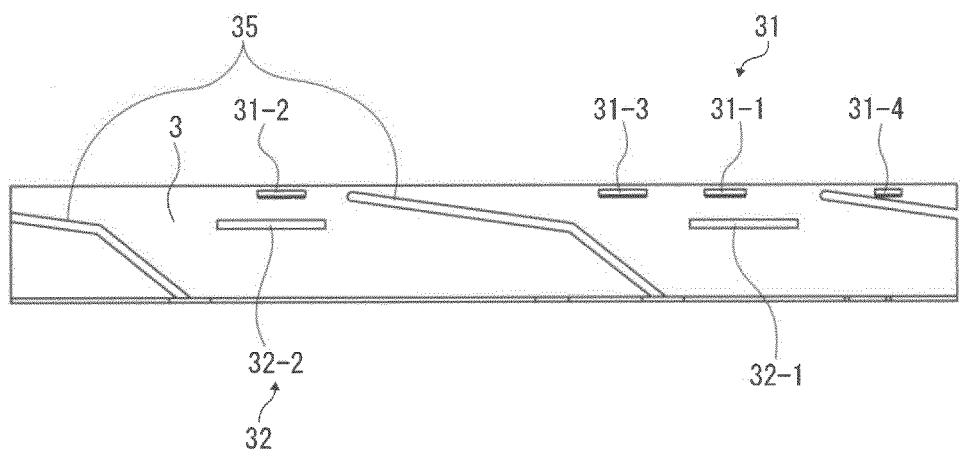
FIG. 19 is a developed view of the outer circumference of a moving cylinder of the lens barrel in FIG. 15.
Figure 20:
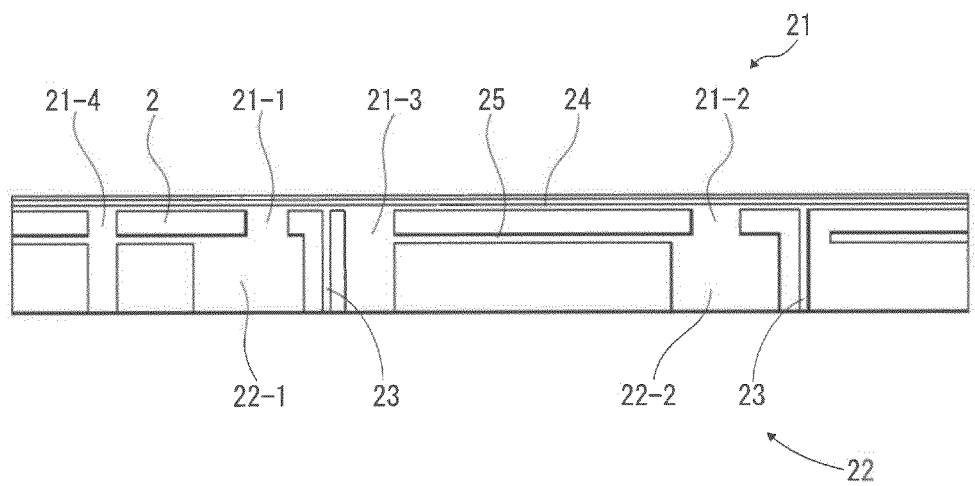
FIG. 20 is a developed view of the inner circumference of a first rotary cylinder of the lens barrel in FIG. 15.

A lens barrel according to a second embodiment of the present invention is described with reference to FIG. 15 to FIG. 20. FIG. 15 is a longitudinal cross section view of a lens barrel according to a second embodiment of the present invention when the barrels are contained. FIG. 16 is a longitudinal cross section view of the lens barrel in FIG. 15 when the barrels are at the shooting startup position. FIG. 17 is a longitudinal cross section view of the lens barrel in FIG. 15 when the barrels are most extended for shooting. FIG. 18 is an exploded perspective view of the lens barrel in FIG. 15. FIG. 19 is a developed view of the outer circumference of the moving cylinder of the lens barrel in FIG. 15. FIG. 20 is a developed view of the inner circumference of the first rotary cylinder 2 of the lens barrel in FIG. 15.

The operation and structure of the lens barrel according to the second embodiment are almost the same as those in the first embodiment in FIG. 1 to FIG. 9. A difference from the one in the first embodiment is in that the rear protrusion group 32 are disposed on the outer circumference about the middle portion of the moving cylinder 3 instead of at the rear end, and accordingly, the second circumferential groove 25 is disposed near the middle portion of the first rotary cylinder 2 behind the first circumferential groove 24 instead of at the rear end, as shown in FIGS. 18, 19. Also, the first and second depressions 22-1, 22-2 as the second guide 22 extend longer along the optical axis than those in the first embodiment.

Thus, the lens barrel according to the second embodiment achieves the same effects as those of the first embodiment.

Third Embodiment

Figure 21:
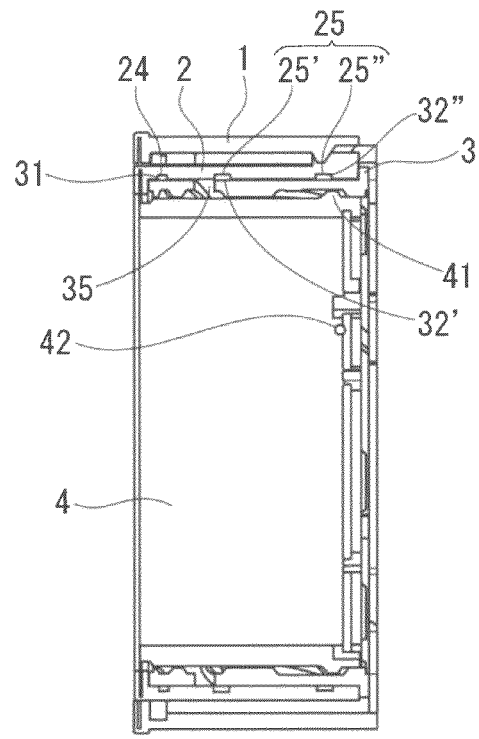
FIG. 21 is a longitudinal cross section view of a lens barrel according to a third embodiment of the present invention when the barrels are contained.
Figure 22:
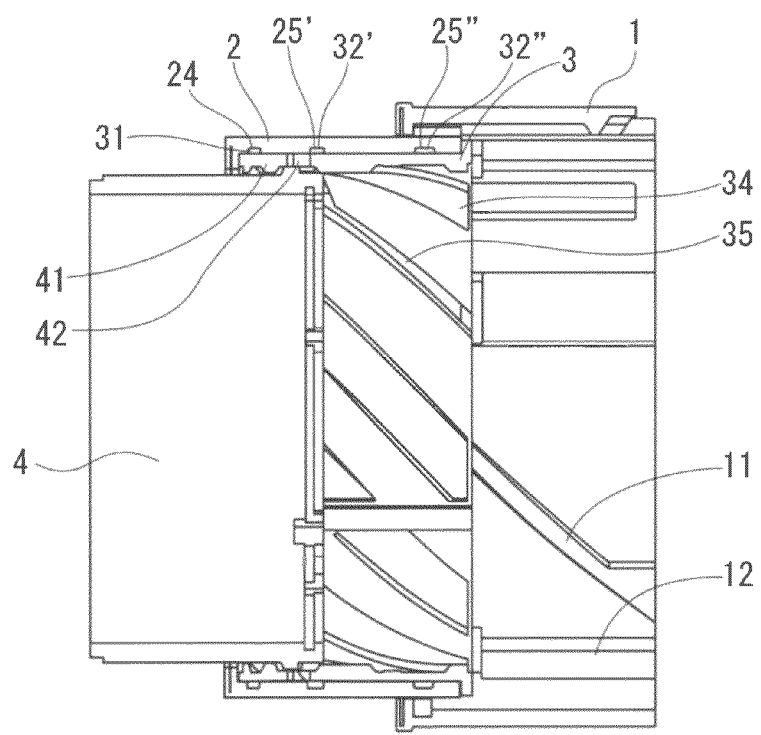
FIG. 22 is a longitudinal cross section view of the lens barrel in FIG. 21 when the barrels are at the shooting startup position.
Figure 23:
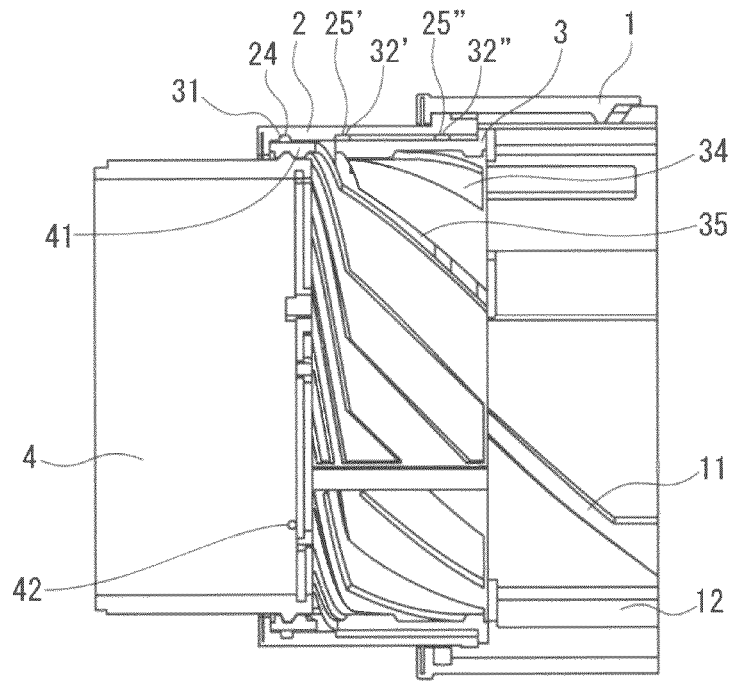
FIG. 23 is a longitudinal cross section view of the lens barrel in FIG. 21 when the barrels are most extended for shooting.
Figure 24:
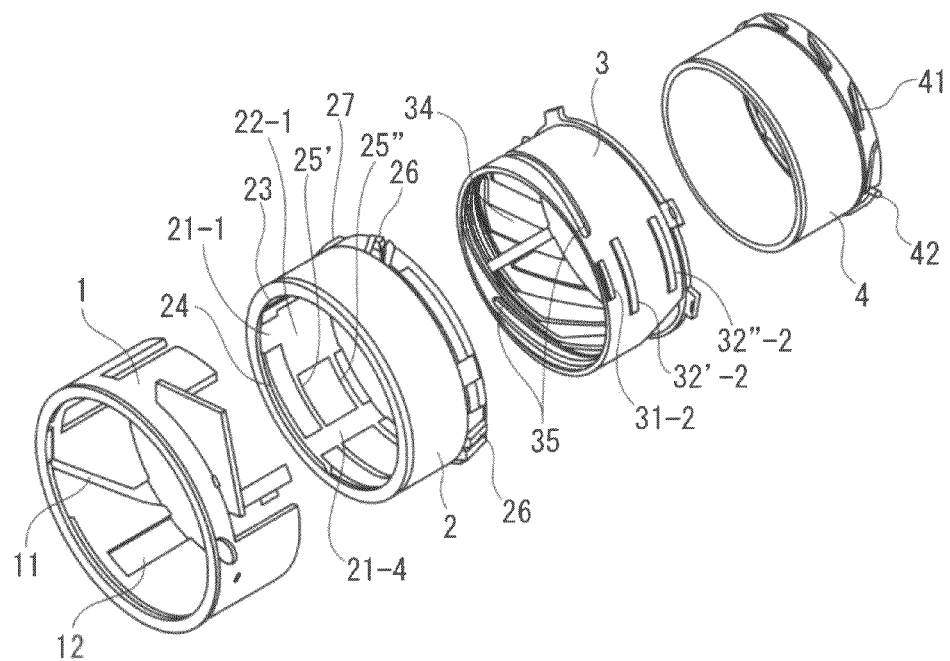
FIG. 24 is an exploded perspective view of the lens barrel in FIG. 21.
Figure 25:
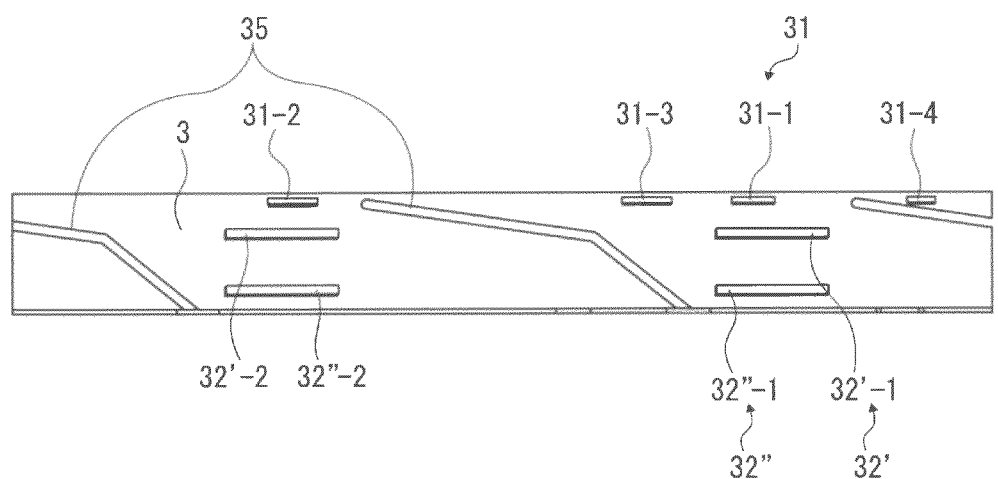
FIG. 25 is a developed view of the outer circumference of a moving cylinder of the lens barrel in FIG. 21.
Figure 26:
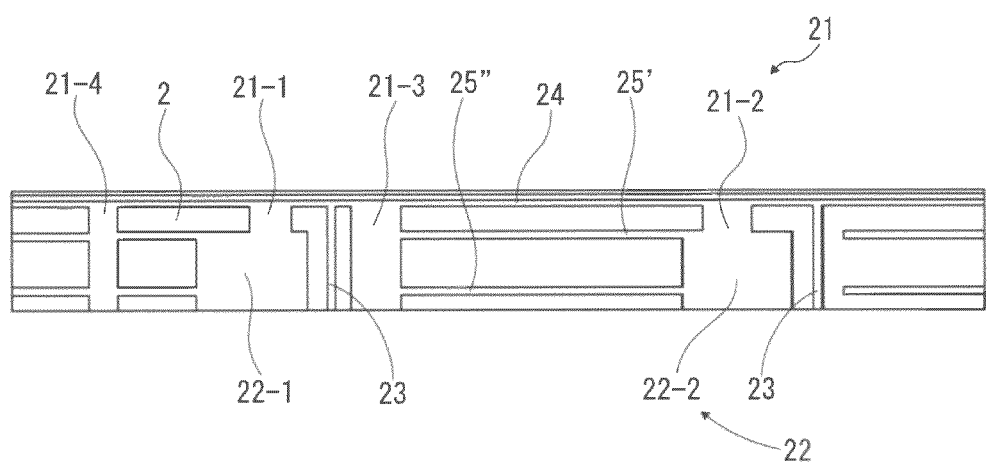
FIG. 26 is a developed view of the inner circumference of a first rotary cylinder of the lens barrel in FIG. 21.

A lens barrel according to a third embodiment of the present invention is described with reference to FIG. 21 to FIG. 26. FIG. 21 is a longitudinal section view of the lens barrel according to the third embodiment when the barrels are contained. FIG. 22 is a longitudinal cross section view of the lens barrel in FIG. 21 when the barrels are at the shooting startup position. FIG. 23 is a longitudinal cross section view of the lens barrel in FIG. 21 when the barrels are most extended for shooting. FIG. 22 is a vertical cross section view of the lens barrel in FIG. 21 when the barrels are at the shooting startup position. FIG. 23 is a longitudinal cross section view of the lens barrel in FIG. 21 when the barrels are most extended for shooting. FIG. 24 is an exploded perspective view of the lens barrel in FIG. 21. FIG. 25 is a developed view of the outer circumference of the moving cylinder of the lens barrel in FIG. 21. FIG. 26 is a developed view of the inner circumference of the first rotary cylinder of the lens barrel in FIG. 21.

The operation and structure of the lens barrel according to the third embodiment are almost the same as those of the first embodiment. That is, a difference from the one in the first embodiment is in that the second circumferential groove 25 is comprised of two grooves, a first rear circumferential groove 25' corresponding to the one in the second embodiment and a second rear circumferential groove 25" corresponding to the one in the first embodiment. Also, the rear protrusion group 32 is comprised of a rear protrusion group 32' of protrusions 32'-1, 32'-2 corresponding to the one in the second embodiment and a second rear protrusion group 32" of protrusions 32"-1, 32"-2 corresponding to the one in the first embodiment.

In the third embodiment in FIGS. 24, 26, the first and second depressions 22-1, 22-2 as the second guide 22 communicate at the front end with the first rear circumferential groove 25' formed near the middle portion of the first rotary cylinder 2 and with the second rear circumferential groove 25" formed at the back end thereof and in between the first and second depressions 22-1, 22-2 as the second guide 22.

In FIGS. 24, 25, the first rear protrusion group 32' of the first and second protrusions 32'-1, 32'-2 is formed about the middle portion of the moving cylinder 3 behind the front protrusion group 31. Likewise, the second rear protrusion group 32" of the first and second protrusions 32"-1, 32"-2 is formed at the rear end.

Thus, in the lens barrel according to the present embodiment, the front protrusion group 31 is provided near the front end of the moving cylinder 3 in accordance with the most extended position, the first rear protrusion group 32' is provided near the middle portion in accordance with the startup position, and the second rear protrusion group 32" is provided near the rear end in accordance with the contained position. Since these protrusions are provided on the moving cylinder 3 at the contained position, the most extended position on which an impact most strongly acts, and the startup position most susceptible to an impact, the bayonet connection of the moving cylinder 3 and first rotary cylinder 2 can be securely maintained irrespective of the position of the lens barrel.

Thus, the lens barrel according to the third embodiment can achieve the same effects as those of the first embodiment.

The number of the protrusions of the first and second rear protrusion groups 32', 32" is 2, however, it can be more than two.

Figure 27:
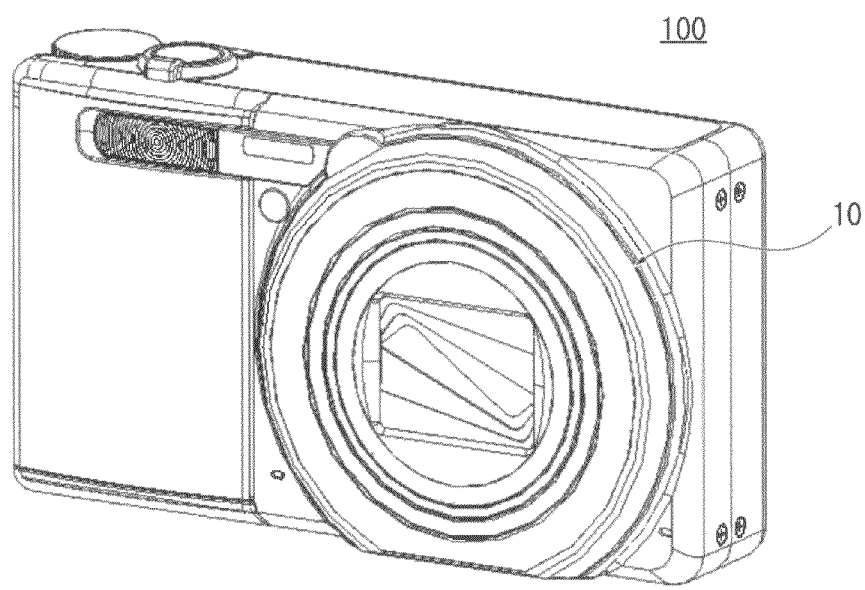
FIG. 27 shows an example of an imaging device incorporating the lens barrel in FIG. 1.

The lens barrel 10 according to any of the first and third embodiment is applicable to an imaging device as a digital camera, a data terminal device as a mobile phone with an imaging function, and an image input device to convert an image captured by an optical system to image data. Such devices incorporating the lens barrel can be unsusceptible to a large impact and prevented from breaking down. FIG. 27 shows an imaging device 100 incorporating a lens barrel 10 according to any of the first and third embodiments by way of example.

Although the present invention has been described in terms of exemplary embodiments, it is not limited thereto. It should be appreciated that variations or modifications may be made in the embodiments described by persons skilled in the art without departing from the scope of the present invention as defined by the following claims.

What is claimed is:

1. A lens barrel comprising:
a fixed cylinder;
a first rotary cylinder rotatably provided around an axis relative to the fixed cylinder; and
a moving cylinder disposed inside of the first rotary cylinder to move integrally with the first rotary cylinder on the axis and rotate around the axis relative to the first rotary cylinder, wherein:
the moving cylinder includes
a front protrusion group including first, second, and third protrusions protruding outward from an outer circumference of a subject side of the moving cylinder, the first protrusion and the second protrusion being arranged to oppose each other across the axis and the third protrusion being placed between the first and second protrusions, and
a rear protrusion group including fourth and fifth protrusions on the outer circumference of the subject side of the moving cylinder at a position closer to an image plane side than the front protrusion group, the fourth and fifth protrusions protruding outward from the outer circumference of the subject side of the moving cylinder, a circumferential width of the fourth and fifth protrusions being twice or more larger than that of the first, second, and third protrusions of the front protrusion group, the fourth protrusion and the fifth protrusion being arranged to oppose each other across the axis and being arranged so that the fourth protrusion overlaps with the first protrusion and the fifth protrusion overlaps with the second protrusion as seen from ahead of the moving cylinder;
the first rotary cylinder includes, in an inner circumference,
a first circumferential groove formed at a position in association with an axial position of the front protrusion group of the moving cylinder,
a second circumferential groove formed at a position in association with an axial position of the rear protrusion group of the moving cylinder,
a first guide having three or more depressions into which the protrusions of the front protrusion group are inserted, respectively, extending in parallel to the axis to communicate with the first circumferential groove, and
a second guide having two or more depressions into which the protrusions of the rear protrusion group are inserted, respectively, extending in parallel to the axis to communicate with the second circumferential groove;
the first, second, third, fourth, and fifth protrusions protrude radially outward from the moving cylinder at an approximately same amount; and
the first rotary cylinder and the moving cylinder are coupled with each other by fitting the front and rear protrusion groups into the first and second circumferential grooves, respectively.

2. A lens barrel according to claim 1, wherein
the rear protrusion group is arranged on a same circumference near an end of the moving cylinder on the image plane side.

3. A lens barrel according to claim 1, wherein
the rear protrusion group is arranged on a same circumference in an axial middle portion of the moving cylinder.

4. A lens barrel according to claim 1, wherein:
the rear protrusion group includes
a first rear protrusion group of two or more protrusions arranged on a same circumference in an axial middle portion of the moving cylinder, and
a second rear protrusion group of two or more protrusions arranged on a same circumference near an end of the moving cylinder on the image plane side; and
the second circumferential groove in the inner circumference of the first rotary cylinder includes
a first rear circumferential groove formed at a position in association with an axial position of the first rear protrusion group, and
a second rear circumferential groove formed at a position in association with an axial position of the second rear protrusion group.

5. A lens barrel according to claim 1, wherein:
the lens barrel is of a retractable type in which the first rotary cylinder and the moving cylinder are retracted into the fixed cylinder; and
the first rotary cylinder and the moving cylinder are brought in a coupled position by fitting the front and rear protrusion groups into the first and second circumferential grooves respectively, and relatively rotating the first rotary cylinder and the moving cylinder at a predetermined angle.

6. A lens barrel according to claim 1, further comprising
a second rotary cylinder disposed inside the moving cylinder and having a pin protruding on an outer circumference, wherein:
the moving cylinder includes a through groove into which the pin is inserted; and
at least two protrusions of the front protrusion group are arranged so as not to overlap the through hole on the axis.

7. A lens barrel according to claim 6, wherein
the first rotary cylinder and the moving cylinder are relatively rotated at a predetermined angle from the coupled position to be in a contained position in which the first rotary cylinder, the moving cylinder, and the second rotary cylinder are contained inside the fixed cylinder, and are further rotated and extended from the fixed cylinder to a shooting position.

8. A lens barrel according to claim 6, wherein:
the first rotary cylinder includes a straight groove along the axis in an inner circumference; and
the pin of the second rotary cylinder is fitted into the straight groove via the through groove of the moving cylinder to transmit rotation of the first rotary cylinder to the second rotary cylinder.

9. A lens barrel according to claim 1, wherein
the front protrusion group of the moving cylinder have a same height in a radial direction.

10. A lens barrel according to claim 1, wherein
the rear protrusion group of the moving cylinder have a same height in a radial direction.

11. A lens barrel according to claim 1, wherein
the front and rear protrusion groups of the moving cylinder have a same height in a radial direction.

12. A lens barrel according to claim 1, wherein:
the protrusions of the rear protrusion group have a larger axial width than the protrusions of the front protrusion group; and
the second circumferential groove have a larger axial width than the first circumferential groove.

13. A lens barrel according to claim 1, wherein
the depressions of the second guide of the first rotary cylinder have a larger circumferential width than the depressions of the first guide.

14. A lens barrel according to claim 7, wherein:
the third protrusion of the front protrusion group is formed to have a larger width than the first and second protrusions, and arranged at a position shifted from the first protrusion by a sum of angles $\alpha$ and $\beta$ in a rotary direction of the first rotary cylinder, where $\alpha$ is a relative rotary angle of the first rotary cylinder and the moving cylinder from the coupled position to the contained position, and $\beta$ is a relative rotary angle of the first rotary cylinder and the moving cylinder from the contained position to a closest shooting position.

15. A lens barrel according to claim 14, wherein
a sixth protrusion of the front protrusion group is formed to have a smaller width than the first protrusion, and arranged at a position shifted from the second protrusion by a sum of angles $\alpha$, $\beta$, and $\gamma$ in the rotary direction of the first rotary cylinder, where $\gamma$ is a relative rotary angle of the first rotary cylinder and the moving cylinder from the closest shooting position to a furthest shooting position.

16. An imaging device comprising the lens barrel according to claim 1 as an optical system to image a subject.

* * * * *